United States Patent [19]
Yada

[11] Patent Number: 5,468,438
[45] Date of Patent: Nov. 21, 1995

[54] PRODUCTION METHOD OF MOLDING STRIPS

[75] Inventor: Yukihiko Yada, Nagoya, Japan

[73] Assignee: Tokai Kogyo Kabushiki Kaisha, Ohbu, Japan

[21] Appl. No.: 193,068

[22] PCT Filed: Jun. 25, 1993

[86] PCT No.: PCT/JP93/00866

§ 371 Date: Jun. 30, 1994

§ 102(e) Date: Jun. 30, 1994

[87] PCT Pub. No.: WO94/00311

PCT Pub. Date: Jan. 6, 1994

[30] Foreign Application Priority Data

Jun. 26, 1992 [JP] Japan ..................... 4-193187

[51] Int. Cl.⁶ .................................................. B29C 47/02
[52] U.S. Cl. ................ 264/139; 156/247; 264/149; 264/167; 264/177.2; 264/252; 264/344; 264/173.17; 425/113; 425/381; 425/465; 425/466
[58] Field of Search ..................... 264/167, 171, 264/177.10, 177.16–177.20, 210.2, 145, 150, 148, 149, 252, 344, 139; 425/466, 381, 465, 113; 156/247

[56] References Cited

U.S. PATENT DOCUMENTS

| | | | |
|---|---|---|---|
| 4,330,497 | 5/1982 | Agdanowski | 264/150 |
| 4,765,936 | 8/1988 | Ballocca | 264/177.16 |
| 4,861,530 | 8/1989 | Zaccaria | 264/177.2 |
| 4,865,796 | 9/1989 | Tamura et al. | 264/149 |
| 5,240,664 | 8/1993 | Hayashi et al. | 264/167 |
| 5,267,846 | 12/1993 | Miyama et al. | 264/177.1 |
| 5,332,541 | 7/1994 | Tamura | 264/167 |

FOREIGN PATENT DOCUMENTS

| | | | |
|---|---|---|---|
| 0209453 | 1/1987 | European Pat. Off. | 264/171 |
| 2431644 | 3/1980 | France | 264/177.1 |
| 59-20745 | 2/1984 | Japan | 264/171 |
| 59-78837 | 5/1984 | Japan | 264/167 |
| 63-8020 | 1/1988 | Japan | 264/167 |
| 1-204713 | 8/1989 | Japan | 264/177.16 |

Primary Examiner—Jeffery R. Thurlow
Attorney, Agent, or Firm—Oblon, Spivak, McClelland, Maier & Neustadt

[57] ABSTRACT

When forming a molding strip of varying cross-sectional shape along its length, lengths for finishing into molding strips are extruded with a prescribed cross-sectional shape through an extrusion port provided in the dies, before removing superfluous portions from the molding strip proper, wherein superfluous portions is extruded using a different resin material which is incompatible with that used for extrusion of the molding strip proper for later removal of said superfluous portions made of the different incompatible resin material from the molding strip proper.

9 Claims, 18 Drawing Sheets

PRODUCTION METHOD OF MOLDING STRIPS

FIELD OF THE INVENTION

The present invention relates to a production method of a long molding strip.

DESCRIPTION OF THE PRIOR ART

Lengthy strips of decorative molding are often used on exterior surfaces of marine vessels, vehicles, building materials and other general machinery and equipment. For example, windshield moldings, side moldings and bumper moldings are usually installed to the edges of the windshield openings and side surfaces of body panels of automobiles and to bumpers thereof.

These moldings usually consist of lengthy extruded resin strips extruded through an extruding dies wherefrom said extruded resin molding strips are extruded with a specific cross sectional shape before being cut to a prescribed unit length.

To produce various types of these kinds of moldings, different molding strip production methods have been disclosed wherein a molding strip is extruded in a specific cross sectional shape before removing a portion of said molding strip by passing said strip through a prescribed cutting process, thus making the cross sectional shape of the molding strip vary along its length. For example, the production methods disclosed in Japanese Utility Model Laid-Open Publication No. 32915/1988, Japanese Utility Model Laid-Open Publication No. 128412/1989 and Japanese Utility Model Laid-Open Publication No. 130816/1989 call for removal, by a cutting process, of the inner peripheral portion of the decorative part of a molding strip which cover up the edges of the windshield glass of an automobile and for equipping a dam portion along the cut.

With some bumper moldings, the molding strip and the mounting pieces which support the molding strip exposing to the outer from the back are extruded integrally before removing a superfluous portion of the mounting pieces by a cutting process so as to see the remaining mounting pieces into the bumper surface for fixing the molding strip onto the bumper.

Production methods are disclosed in Japanese Patent Laid-Open Publication No. 112845/1983 and Japanese Utility Model Laid-Open Publication No. 76057/1987 wherein a molding strip is extruded in a hollow sectional shape for the purpose of making the molding of lighter in weight but providing resin-filled ribs several sections along the length as reinforcing ribs. Said resin-filled ribs functioning as reinforcing ribs work to maintain a uniform, solid external appearance, therefore, such reinforcing ribs are often positioned at the bent sections of a molding. Hollow moldings are extruded, for example, in a C-shaped section and the reinforcing ribs are formed to fill the hollow section of the C-shape at prescribed distances.

Further, in regard to the windshield molding strips for automobiles, Japanese Patent Laid-Open Publication No. 291721/1988 discloses a windshield molding strip to be installed to cover the upper and side edges of a windshield glass and Japanese Patent Laid-Open No. 289716/1989 etc., disclose an automotive windshield molding strip equipped with a conduit groove which functions as a rainwater flume. With conventional production methods for molding provided with the flume, a molding strip with the flume and one without such flume are separately extruded before joining the two strips together using joints or the like.

In fact, however, with conventional molding production methods employing a cutting process for the above-mentioned purpose, the potential for shaping in the cutting process is limited and, especially, a cutting process to hollow out the section shape by undercutting is generally impossible. Also, when the cutting length is in a longer range, very large sized dies become necessary.

Furthermore, when forming the filled ribs to function as reinforcing ribs with a molding, "padding" is placed at several sections of a molding, but with such conventional production methods, an additional process becomes necessary to join separate parts which were extruded separately. In other words, with conventional production methods of the above-mentioned type of molding, it has not been possible to integrally or in series form the total length of a molding equipped with resin-filled ribs to work as reinforcement ribs, thus resulting in low productivity.

Moreover, when providing equipping a molding with a flume using conventional methods, some component molding parts become necessary and, to make the situation even more complicated, the production processes of the molding become more complex.

However, with the windshield glass molding disclosed in Japanese Patent Laid-Open Publication No. 195082/1989, the molding strip is extruded all the way along the entire length of said molding strip in a fixed cross-sectional shape involving a projecting dam which is then cut and removed at sections where it is unnecessary. Nevertheless, with this type of molding, sharp edges remain on the cut face, requiring a post-finishing process to dull the edges, with the result that the surface of the cut section has a different appearance from that of sections where cutting has not been performed.

The present invention consequently intends to provide a molding production method wherewith superfluous portions can be removed without using the cutting process and cross sectional shapes which hitherto have been difficult to achieve such as an under-cut shape can be chosen comparatively freely under an easier processing method.

Moreover, the present invention intends to provide a production method of a molding which can be easily extruded integrally throughout the entire length, including the resin filled ribs to function as reinforcing ribs.

The present invention further intends to provide an efficient production method of a molding provided with a flume to work as a rainwater conduit integrally throughout the whole length.

SUMMARY OF THE INVENTION

In order to achieve the said purposes, the molding production method of the first embodiment is characterized by a measure to extrude the molding strip of which the necessary portion is made of a specific resin and the superfluous portion to be removed later is made of some other kind of resin which can be separated from the necessary portion of the molding strip by molding with a production method wherewith the cross-sectional shape is made to vary along Its length by removing the superfluous portion from the necessary portion of the molding strip extruded through the extrusion port of the dies mounted in an extruder.

The molding production method of the second embodiment is characterized by a measure wherein the superfluous portion is separated from the molding strip by undercutting.

The molding production method of the third embodiment features a measure wherein several blocks of superfluous of prescribed lengths throughout the length of the molding strip are removed, thus providing several blocks of hollow sections and resin-filled sections one after the other at prescribed distances throughout the length of the molding strip.

The molding production method of the fourth embodiment is characterized by a measure whereby a molding strip is cut at the resin-filled sections at both ends so that both ends become resin filled closed walls of a unit length.

The molding production method of the fifth embodiment is characterized by a measure wherein a molding strip of partially different cross-sectional shapes depending on its section are integrally and continuously extruded through a varying extrusion port by shifting the relative positions of multiple dies when extruding the sections where removal of the superfluous portion is not carried out during a continuous extrusion molding process for a total length of the molding strip using multiple sets of dies for the extruder.

By use of these measures in these embodiments, removal of superfluous parts can be accomplished by a separation process without requiring a cutting process, thus improving forming ease and providing more optional choices of extruded shapes as compared with conventional methods involving cutting processes, and the total length of a lengthy molding strip can be extruded integrally and continuously.

In particular, using the measure of the fifth embodiment, the lengthy molding strip being extruded has a cross-sectional shape varying continuously along the length of the strip.

BEST-MODE FOR CARRYING OUT THE INVENTION

Figure 1:
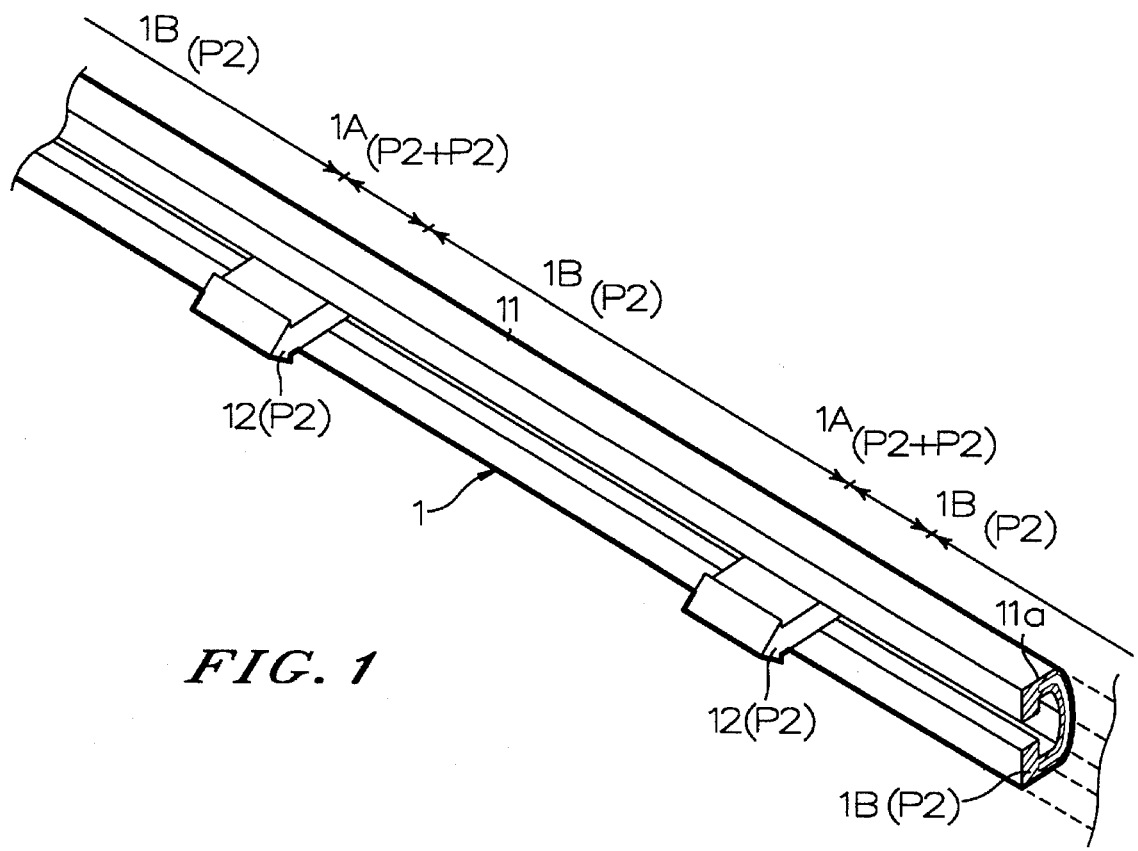
FIG. 1 is a perspective drawing of a molding strip extruded under an exemplary embodiment of this invention.

Referring more particularly to the exemplary embodiments of this invention using the drawings, FIG. 1 shows an example of molding strip 1 which can be extruded under the production method of this invention, which is to be installed to the bumper of an automobile. The molding strip 1 has a decorative body 11 and a mounting pieces 12 supporting the decorative body 11 from the back. The mounting pieces 12 are to be set into the surface of the bumper of an automobile for fixture of the molding onto the bumper so as to expose the decorative body 11 to outer side.

The molding strip 1 consists of fully-equipped sections 1A and removal sections 1b continuously ranging along its length alternatively. Such fully-equipped sections 1A are integrally provided with both said decorative body 11 and mounting pieces 12 while the removal sections 1b are provided with the decorative body 11 only, from which the mounting pieces have been removed.

Each decorative body 11 is made of a transparent ionomer resin P2 extruded in a prescribed C-shaped cross-section throughout its whole length including the fully-equipped sections 1A and the removal sections 1B. Further, laminated metallic films 11a formed in a mating C-shaped cross-section are embedded into the outer area of said decorative body 11, where mounting pieces 12 are extruded in a cross-sectional arrow shape integrally projecting from behind the decorative body 11 and are made of the same transparent ionomer resin P2.

The mounting pieces 12 are located at prescribed intervals along the length of the molding strip 1 and each mounting piece 12 is of a prescribed short length in the longitudinal direction. The section between two mounting pieces 12 has a hollow section from which the mounting pieces 12 have been removed.

Meanwhile, as referred to later, the molding strip right after extrusion also has the superfluous portions 12a (see FIG. 11) which are separated and removed from said decorative body 11 later. Meanwhile, the mounting pieces 12 may be extruded using a different kind of resin from that for the decorative body 11 insofar as the former resin has compatibility with the latter.

Referring more particularly to an exemplary facility for extrusion of a molding strip 1 of said structure, the molding strip can be produced by extruding workpiece strips through a dies (extruding dies) 2, shown in FIG. 2, before passing workpiece strips through the removal process referred to later.

The dies 2 comprised of a stationary first die 21 and a second die 22 which is movable for fitting to the first die 21 in parallel with it, wherewith the material of the extrusion resin extruded through a extrusion port 211 provided in the first die 21 can be switched over by parallel shifting of the second die 22.

Figure 2:
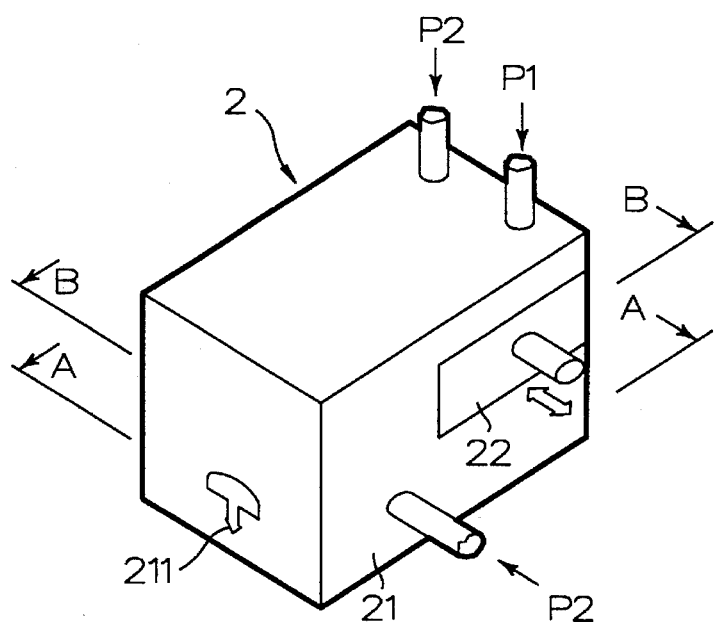
FIG. 2 is a perspective drawing of an example of the dies for extrusion of the molding strip as shown in FIG. 1.
Figure 3:
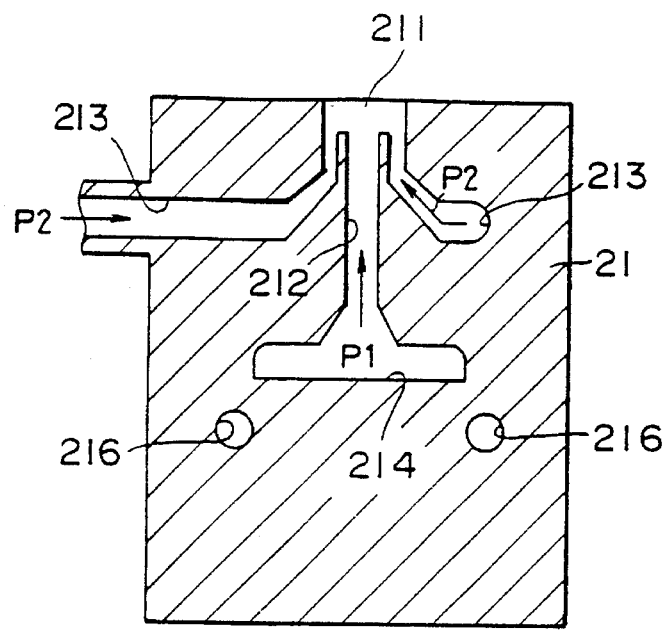
FIG. 3 is the horizontal A—A section of the drawing as in FIG. 2.
Figure 4:
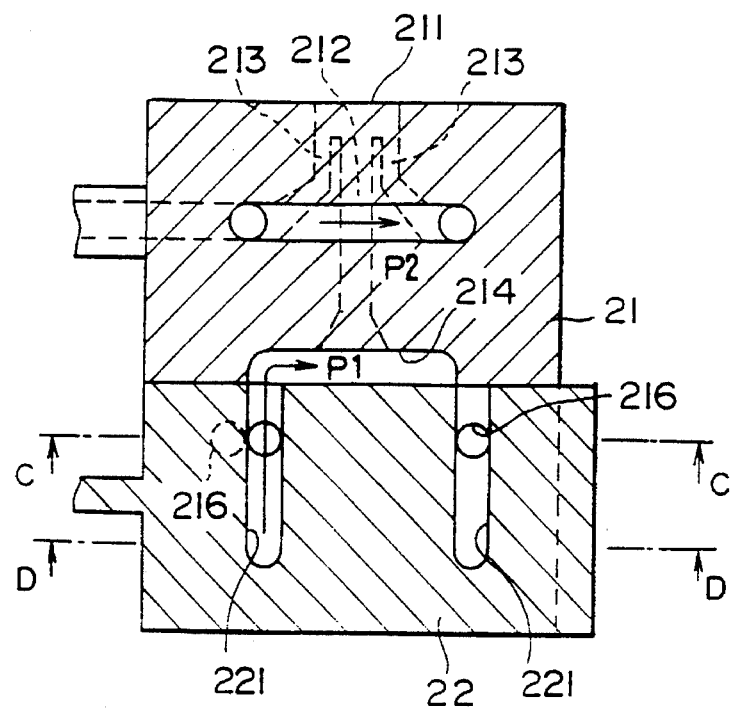
FIG. 4 is the horizontal B—B section of the drawing as in FIG. 2.
Figure 5:
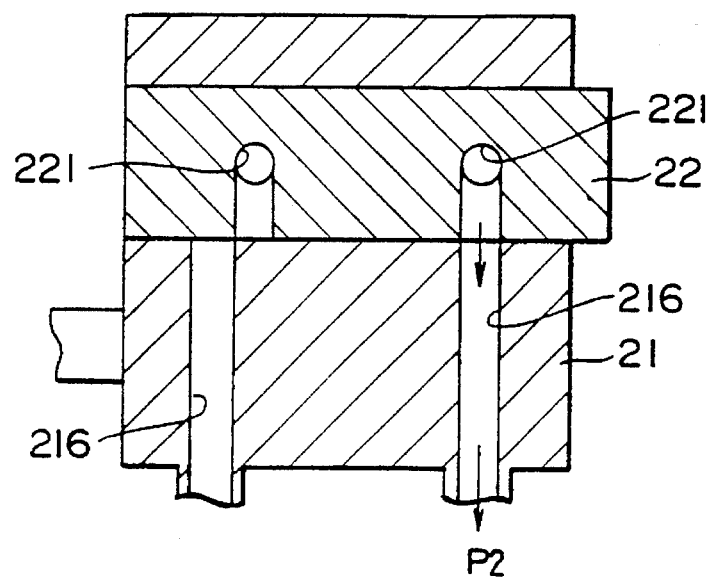
FIG. 5 is the C—C cross section of the drawing as in FIG. 4.
Figure 6:
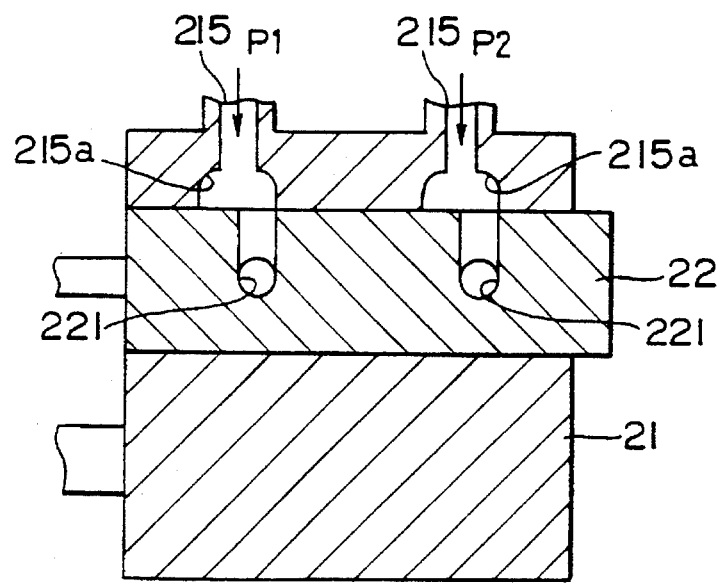
FIG. 6 is the D—D cross section of the drawing as in FIG. 4.
Figure 7:
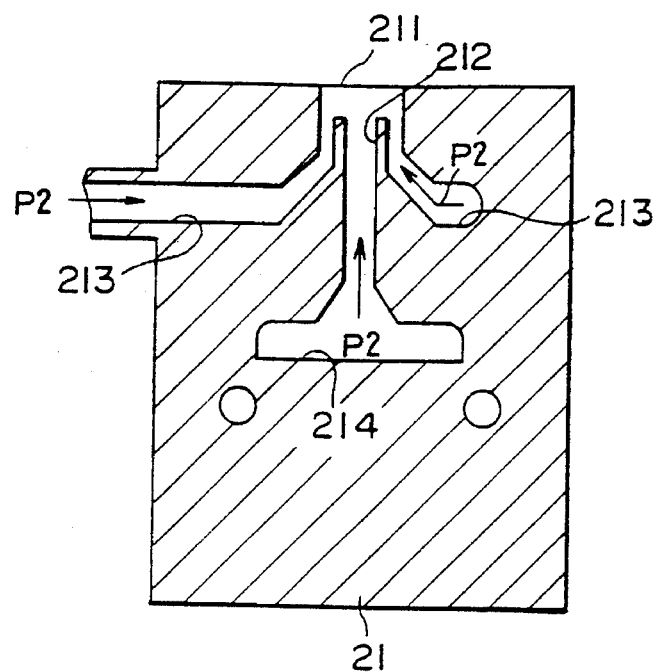
FIG. 7 is a cross sectional view showing the shifts of the dies indicated in FIG. 3.
Figure 8:
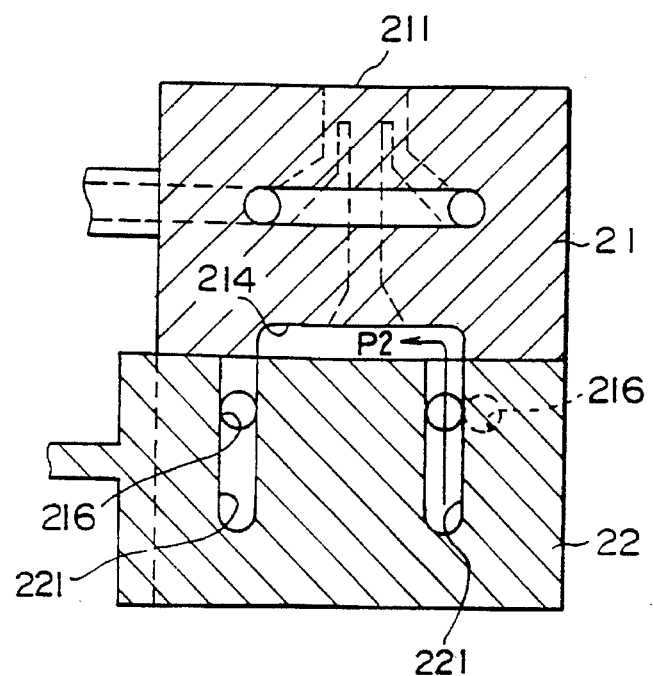
FIG. 8 is a cross sectional view showing the shifts of the dies indicated in FIG. 4.
Figure 9:
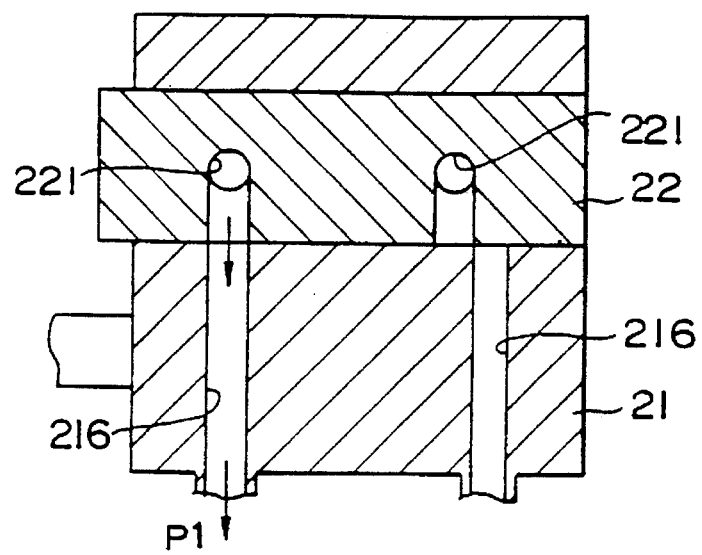
FIG. 9 is a cross sectional view showing the shifts of the dies indicated in FIG. 5.
Figure 10:
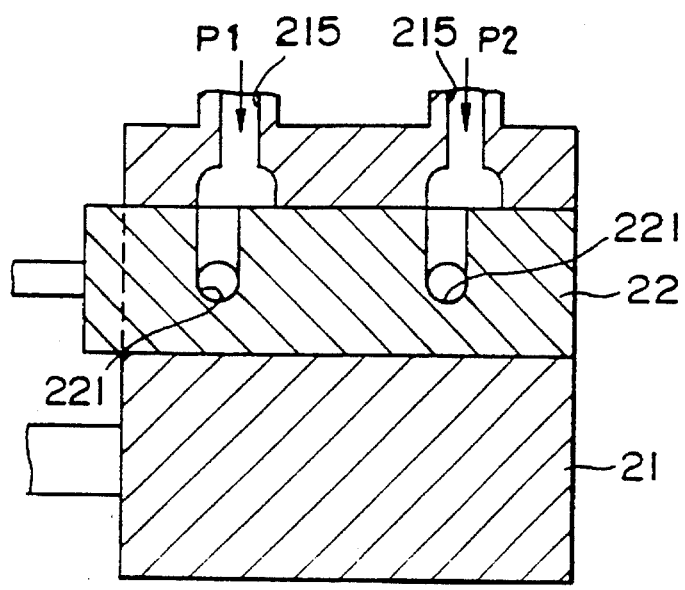
FIG. 10 is a cross sectional view showing the shifts of the dies indicated fin FIG. 6.

As shown in FIG. 2, FIG. 3 and FIG. 6, the first die 21 is provided with an extrusion port 211 opening on its front end face and is also provided with one mounting piece extrusion channel 212 and two decorative body extrusion channels 213, 213 continuing to the inner end of the extrusion port 211.

The mounting piece extrusion channel 212 opens into the center of the extrusion port 211 and the two decorative body extrusion channels 213, 213 are respectively positioned on either sides of the mounting piece extrusion channel 212 and respectively open into the peripheral area of the extrusion port 211. One of these two decorative body extrusion channels 213, 213 extends and turns toward the side surface of the first die 21 and the supply source of a resin P2 (a transparent ionomer resin) which is omitted from the drawing is connected to the external supply port thereof, while the other hand decorative body extrusion channel 213 branches off from an intermediate point of the one hand decorative body extrusion channel 213 connected to said resin supply source extending over the mounting piece extrusion channel 212 before opening out to the extrusion port 211.

At the base position of said mounting piece extrusion channel 212, a reservoir 214 of prescribed cavity dimensions is provided and the second die 22 which faces said reservoir 214 is fitted, allowing horizontal reciprocal motion perpendicular to the direction of extrusion. The second die 22 is provided with a pair of switch-over channels 221, 221 positioned in parallel along the direction of extrusion which are so structured that one of them alternatively opens into the cavity of the reservoir 214 in said first die 21 and the horizontal reciprocal shifts of said second die 22 determine the choice between the two switch-over channels 221, 221.

Moreover, said first die 21 is provided with a pair of material supply channels 215, 215 and a pair of material exhaust channels 216, 216 facing each other in the up/down direction across the switch-over channels 221, 221 in the second die 22.

The material supply channels 215, 215 are provided with tubs 215a, 215a which always open to the switch-over channels 221, 221 of said second die 22. Through one of these pair of material supply channels 215, 215, the resin material P2 is fed, while through the remaining material supply channel, the resin material P1 is fed, which is of a different kind from the resin material P2.

A PVC resin, for example, can be used as the resin material P1 which is incompatible with the resin material P2, while, the material exhaust channels 216, 216, respectively, are arranged so as open alternatively to the switch-over channels 221, 221, respectively, of said second die 22 and the bottom surface of the first die 21.

Referring more particularly to an exemplary embodiment of this invention for extrusion of said molding strip 1 using said facility, firstly, when extruding the fully equipped sections 1A comprising of the decorative body 11 and the mounting pieces 12 integrally, the first die 21 and the second die 22 are shifted to the relative positions as shown in FIG. 7 to FIG. 10. With this shift, between the two switch-over channels 221, 221 provided in the second die 22, the one switch-over channel 221 in the open connection with the material supply channel 215 feeding the resin material P2 (the right side one in the drawing) opens into the reservoir 214 in the first die 21, while the other switch-over channel 221. In the open connection with the material supply channel 215 feeding the resin material P1 (left side one in drawing) remains away from reservoir 214, being closed, but opens into one of the material exhaust channels 216, 216.

With this layout, as shown in the drawings by arrows, resin material P2 fed into one of the change-over channels 221 (right side one in drawing) of the second die 22 via one of the material supply channels 215, 215 (right side one in drawing) of the first die 21 passes through the mounting piece extrusion channel 212 of the first die 21 before extruding through the central section of the extrusion port 211.

As a result, the mounting pieces 12 of the molding strip 1 are formed by extrusion of the resin material P2. At this time, resin material P2 is constantly supplied through the decorative body extrusion channels 213, 213 in the first die 21 and the resin material P2 is extruded through the peripheral area of the extrusion port 211 via the both decorative body extrusion channels 213, 213. Consequently, as per the cross-section shown in the drawing in FIG. 11, the decorative body 11 and the mounting pieces 12 are integrally formed by extrusion of the resin material P2 thus forming the fully equipped section 1A of the molding strip 1.

Meanwhile, the resin material P1 fed into the other switch-over channel 221 (left side one in drawing) in the second die 22 via the other material supply channel 215 (left side one in drawing) in the first die 21 bypasses the reservoir 214 and is exhausted through the material exhaust channel 216.

Next, when extruding the separating sections 1B of the molding strip 1, the first die 21 and the second die 22 are shifted to the relative positions as shown in FIG. 3 to FIG. 6. By this shift, between the two switch-over channels 221, the one switch-over channel 221 (the left side one in the drawing) in the open connection with the material supply channel 215 feeding the resin material P1 opens into the reservoir 214 in the first die 21, while the other switch-over channel 221 (right side one in drawing) in open connection with the material supply channel 215 feeding the resin material P2 remains away from reservoir 214, being closed, but opens Into the other side of the material exhaust channel 216.

With this layout, as shown in the drawings by arrows, resin material P2 fed into the other switch-over channel 221 (left side one in drawing) in the second die 22 via the other material supply channel 215 (left side one in drawing) in the first die 21 passes through the mounting piece extrusion channel 212 in the first die 21 before extruding through the central section of the extrusion port 211.

Thus, the mounting piece sections 12 of the molding strip 1 are formed by extrusion of the resin material P1 as superfluous portions 12a.

Figure 12:
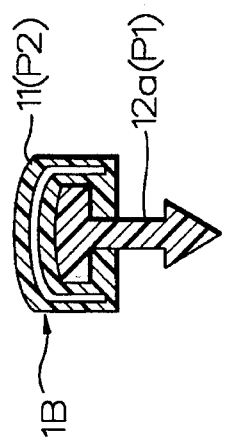
FIG. 12 is the E—E cross section of the drawing as in FIG. 11.

At this time, resin material P2 is constantly fed into the decorative body extrusion channels 218, 213 in the first die 21 and the resin material P2 is extruded through the peripheral area of the extrusion port 211 via the both decorative body extrusion channel 213, 213. Consequently, as shown in FIG. 12, the decorative body 11 is formed, surrounding said superfluous sections 12a, by extrusion of different resin material P2, independently.

At this time, the resin material P2 fed into the other switch-over channel 221 (right side one in drawing) in the second die 22 via the other material supply channel 215 (right side one in drawing) in the first die 21 bypasses the reservoir 214 to be exhausted through the material exhaust channel 216.

Figure 11:
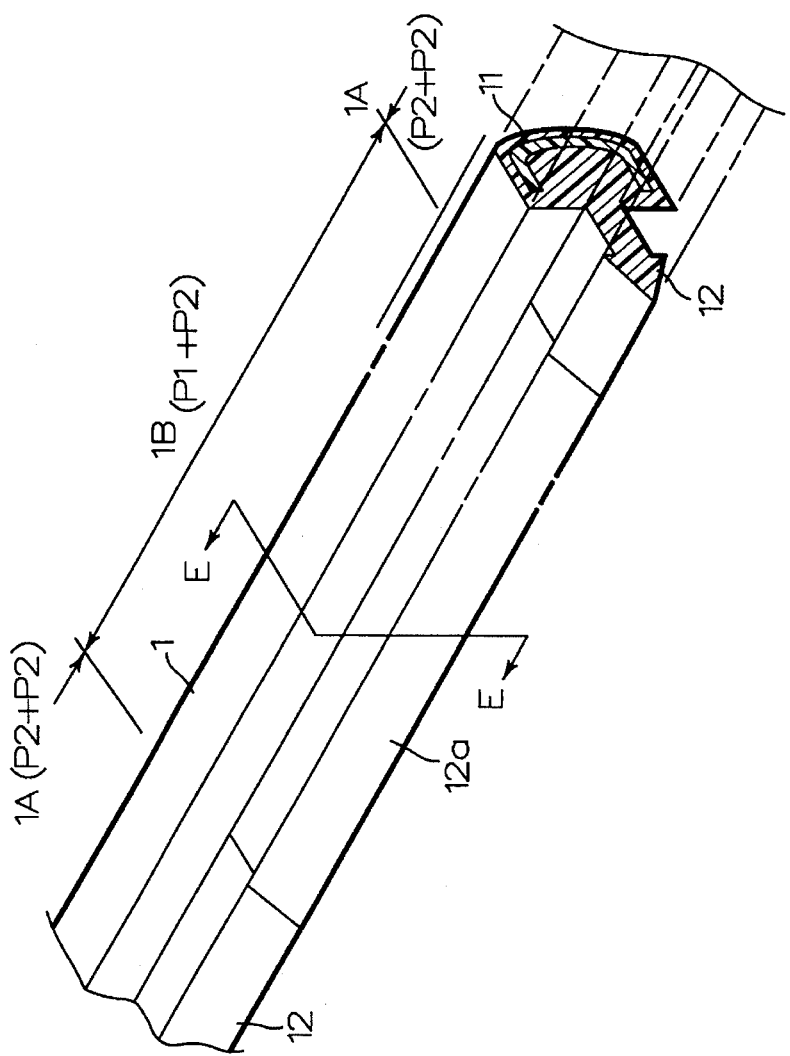
FIG. 11 is a perspective drawing of the molding strip as is shown in FIG. 1, right after extrusion but before the removal process of the superfluous portions.

When actually extruding the molding strip 1, as shown in FIG. 11, the fully equipped sections 1A and removal sections 1b are extruded alternatively, a fully equipped section 1A is extruded for a short prescribed length before a removal section 1B is extruded for a prescribed length and a fully equipped section 1A is extruded again, and such cycle is repeated. At this time, the decorative body 11 is extruded in the same cross-sectional shape by the same resin material P2 throughout the entire length of the molding strip 1 consisting of the fully equipped sections 1A and the removal sections 1B.

While the mounting pieces 12 are extruded integrally with the decorative body 11 using the resin material P2 throughout the short length within the range of the fully equipped section 1A, but at the border with the separating section 1B, the resin material is changed to P1 from P2. In other words, while extruding the separating section 1B, the section corresponding to the mounting piece 12 is extruded using resin material P1 to form a virtually resin-filled section which actually becomes the superfluous portion 12a which is incompatible with and removable from the decorative body 11.

Figure 13:
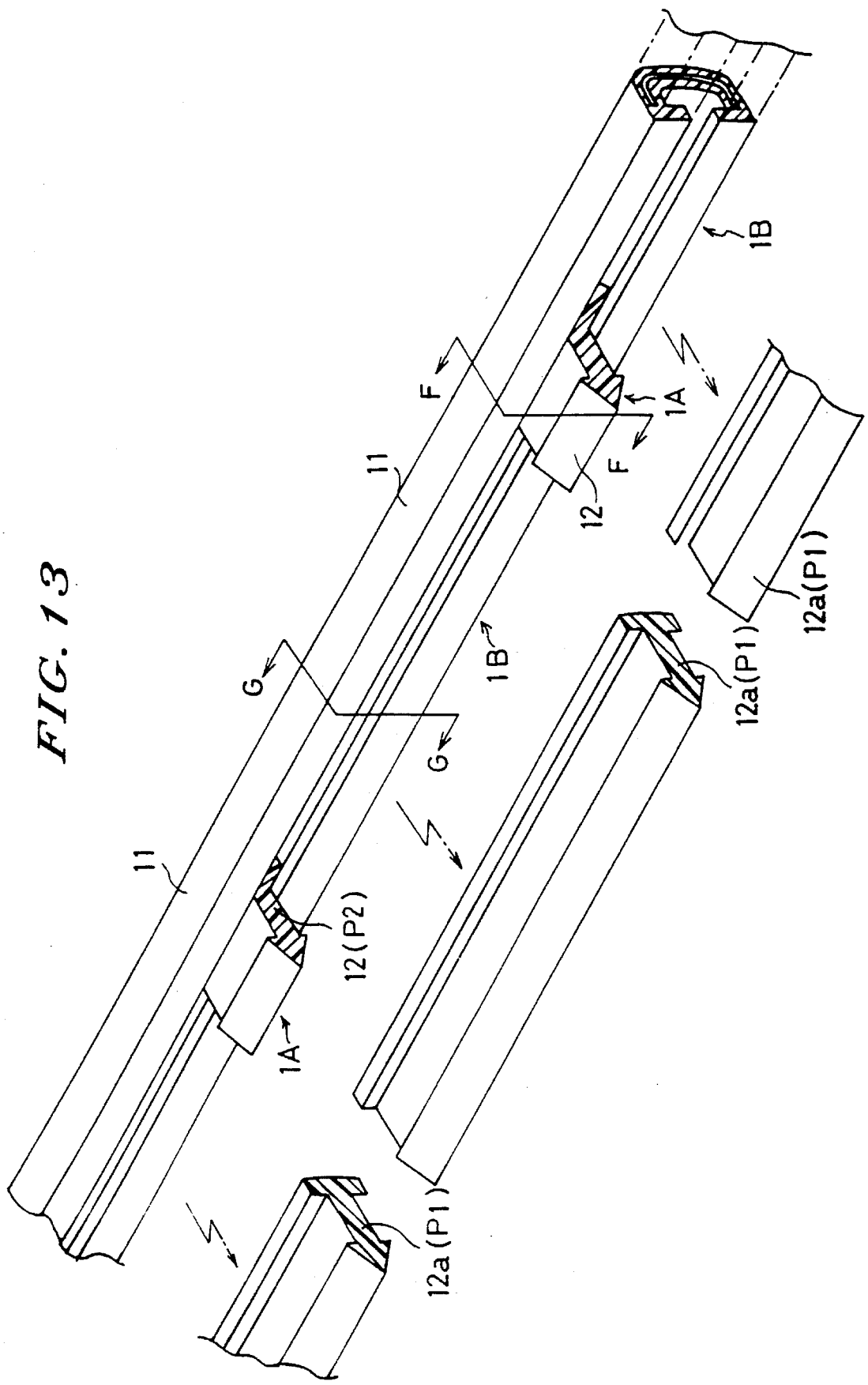
FIG. 13 is a perspective drawing of the molding strip as is shown in FIG. 11 from which the superfluous portions have been removed.
Figure 14:
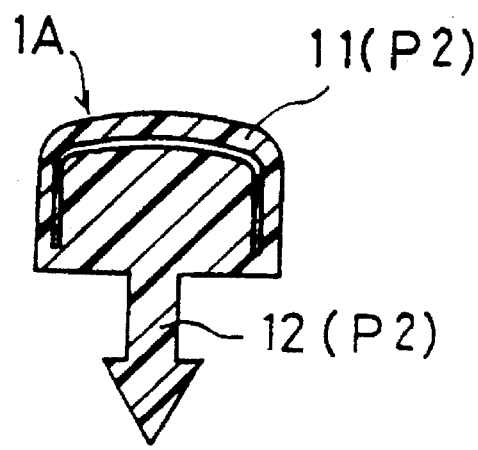
FIG. 14 is the F—F cross section of the drawing as in FIG. 13.
Figure 15:
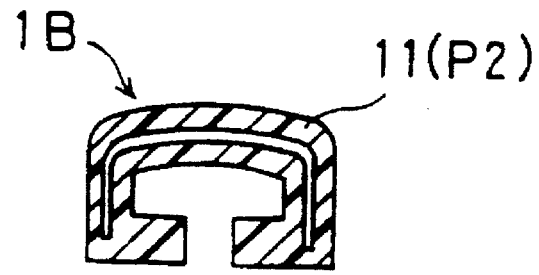
FIG. 15 is the G—G cross section of the drawing as in FIG. 13.

After production work for molding strips under the above-mentioned extrusion process, as shown in FIG. 13, the superfluous portions 12a are separated and removed from the removal sections 1B. Thus, the fully equipped section 1A shown as FIG. 14 and the removal section shown as FIG. 15 are formed to become the molding strip 1 of the final shape.

Although the superfluous portions 12A of this exemplary embodiment are extracted forcibly from the under-cut shape, no functional or dimensional defects are anticipated and, especially, when separating and removing the superfluous portions 12a after a cooling process, removal can be effected very easily and smoothly. Also, if the superfluous portions 12a are formed by a water soluble resin, the cooling process in a water tank can melt away the superfluous portions 12a to complete the removal process simultaneously. Meanwhile, said removal process of the superfluous portions 12a can be carried out either before or after cutting the molding strips into unit lengths.

When using said extrusion methods, since the superfluous portions can be easily separated and removed without the use of cutting processes, under-cut shape extrusion or the like can be freely adopted, thus giving more optional choices for extrusion shapes.

Figure 16:
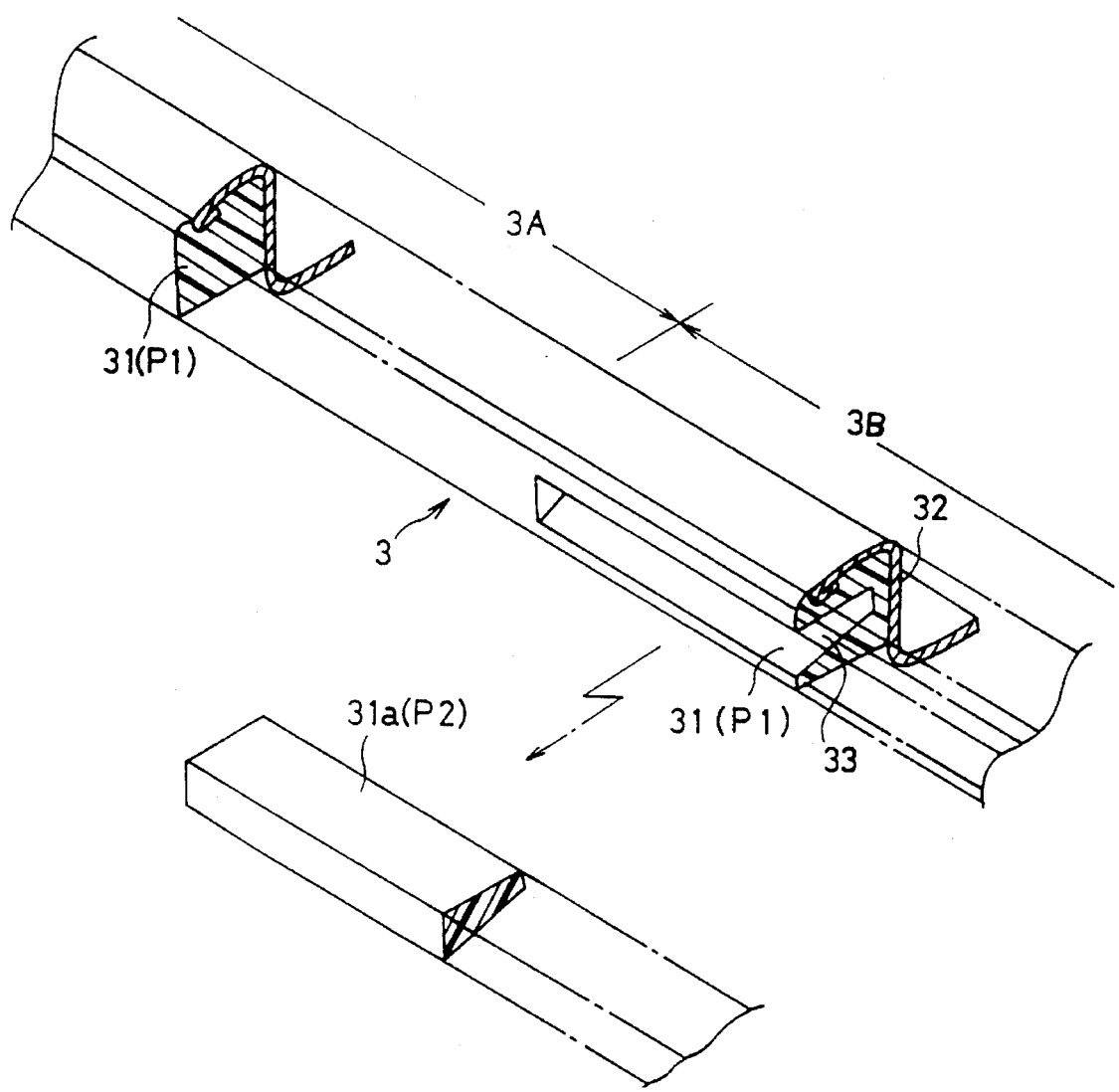
FIG. 16 is a perspective drawing of another example of the molding strip extruded under the production method of this invention.

Referring next to the molding strip 3 shown in FIG. 16 which forms a molding to cover the windshield openings in the body panel of an automobile and which can be similarly produced under an embodiment of this invention, with this molding strip 8, a decorative body 31 made of prescribed resin material P1 such as PVC is supported by a metallic mount 32 to constitute the molding strip and said mount 82 is mounted around she windshield openings of an automobile to fix the decorative body 31 in position.

The fully equipped section 3A of said molding strip is extruded in a prescribed rectangular section throughout its entire length while the removal section 3B is provided with grooved rainwater conduit 33 provided along the prescribed length. The grooved rainwater conduit 33 provided in the removal section 3B has a wedge-shaped cross section and the groove is tentatively extruded forming a superfluous portion 31a using similar dies (extruder dies) to the aforementioned ones.

In other words, the superfluous portion 31a is formed by extrusion of some other resin material P2 incompatible with the resin material P1 which forms the decorative body 31.

From the molding strips thus produced, said superfluous portions 31a made of said incompatible resin material P2 are removed as shown in the drawing under a prescribed removal process to become the molding strip 3 of the final shape.

By use of said extrusion method under the second exemplary embodiment of this invention, similar functions and effects can be attained as those from the extrusion method under the aforementioned first exemplary embodiment of this invention.

Figure 17:
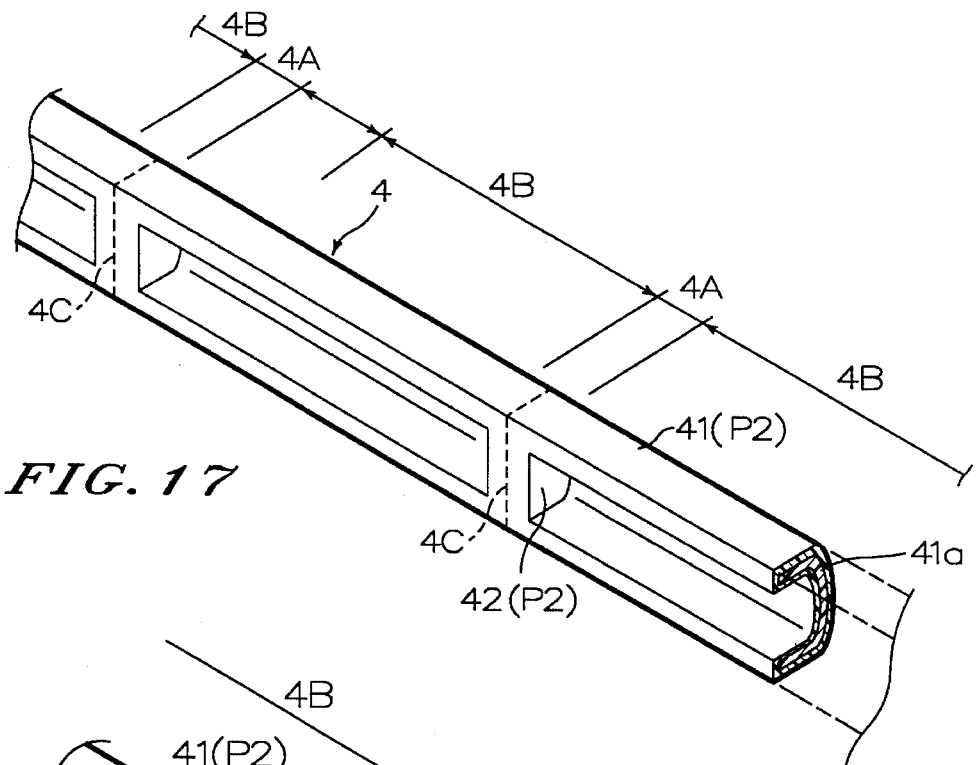
FIG. 17 is a perspective drawing of some other example of the molding strip extruded under the production method of this invention.
Figure 18:
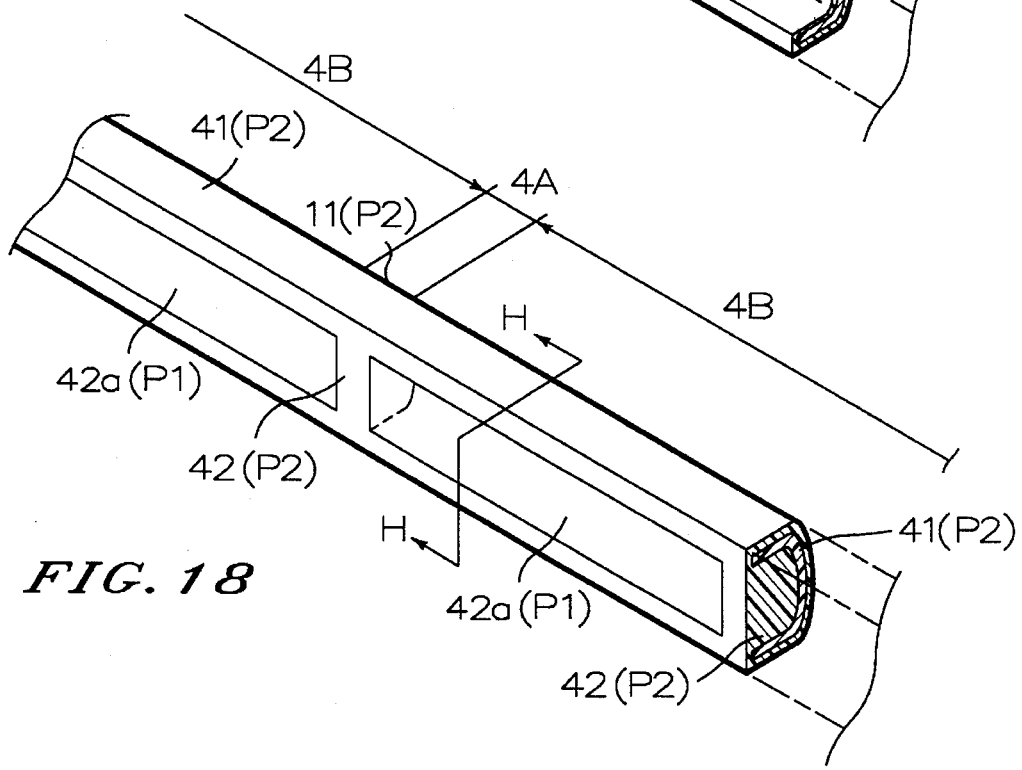
FIG. 18 is a perspective drawing of the molding strip as is shown in FIG. 17, right after extrusion but before the removal process of the superfluous portions.
Figure 19:
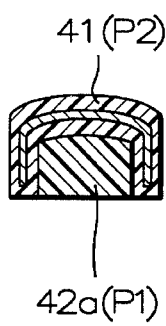
FIG. 19 is the H—H cross section of the drawing as in FIG. 18.

Referring further to the molding strip 4 for automotive applications as shown in FIG. 17, FIG. 18 and FIG. 19 as is obtained by an extrusion method under this invention, this consists of the decorative body 41 with a C-shaped cross-section positioned to be exposed externally and the reinforcing rib 42 integrally filling a distance of the C-shape sectioned decorative body 41 by the resin material. The molding strip 4 comprises along its length, resin-filled sections 4A and hollow sections 4B in series, the resin-filled sections 4A being of a resin-filled cross-section integrally provided with both decorative body 41 and reinforcing ribs 42 while said hollow sections 4B consist only of the hollow-shaped decorative body 41 without the reinforcing ribs 42.

The decorative body 41 is formed by a transparent ionomer resin P2 and extruded in the same cross-section (C-shaped section) throughout the whole length including the distances of the resin-filled sections 4A and of the hollow sections 4B.

Also, laminated metallic films with a mating C-shaped section are embedded into the outer periphery of said decorative body 41. While the reinforcing rib 42 consists of a rib formed by filling a distance of the hollow section with the same transparent ionomer resin forming the decorative body 41.

The reinforcing ribs 42 are located at prescribed intervals along the length of the molding strips with a prescribed short length in the longitudinal direction. Sections between two reinforcing ribs 42, 42 are formed into a hollow C-shaped section surrounded by the internal surfaces of the decorative body 41. The section corresponding to the hollow section between two reinforcing ribs 42, 42 is initially extruded to form a virtually resin-filled section which actually becomes the superfluous portion 42a which is incompatible with and later removable from the decorative body 41.

When actually extruding said molding strips 4, as shown in FIG. 18 to FIG. 22, resin-filled sections 4A and hollow sections 4B are extruded alternatively, a hollow section 4B forming virtually resin filled section being extruded for a prescribed length before a resin filled section 4A is extruded for a prescribed short distance and a hollow section 4B is extruded again, and such cycle is repeated.

In other words, the decorative body 41 is extruded in a uniform cross-section throughout the whole length of the molding strip 4 comprised of the resin-filled sections 4A and hollow sections 4B using the same resin material P2.

While the reinforcing ribs 42 are extruded in the resin-filled ribs integrally with the decorative body 41 using the same resin material P2 over the distance of the resin-filled sections 4A but at the border into the hollow sections 4B, the material is changed from the resin material P2 to P1 thus forming virtually resin-filled sections which actually become superfluous portions 42a which are incompatible with and later removable from the decorative body 41.

Figure 20:
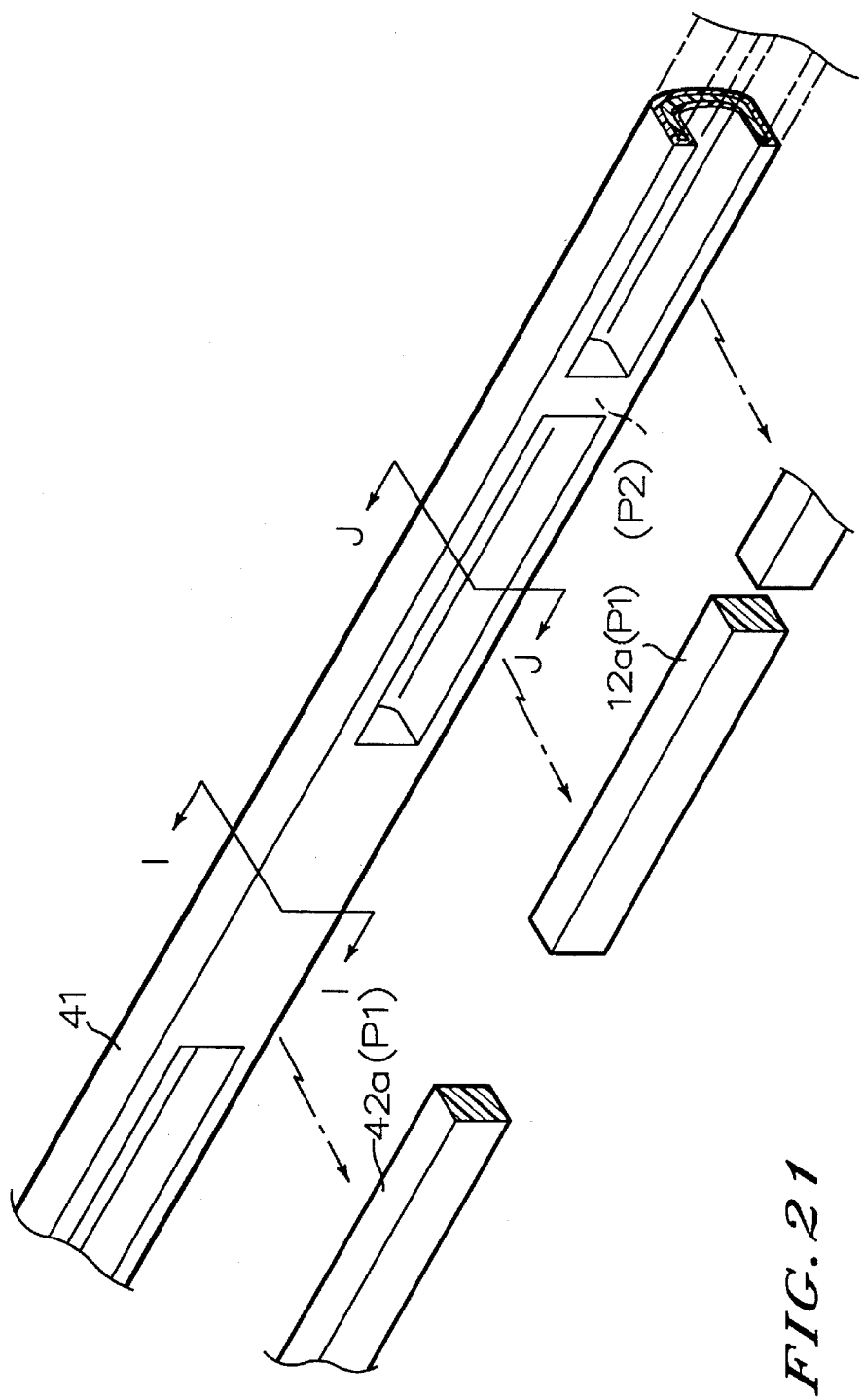
FIG. 20 is a perspective drawing of the molding strip as is shown in FIG. 18 from which the superfluous portions have been removed.

After obtaining the molding strips by the aforementioned extrusion, as shown in FIG. 20, the superfluous portions 42a are separated and removed from the hollow section 4B.

Figure 21:
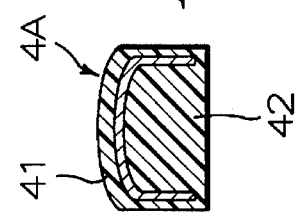
FIG. 21 is the I—I cross section of the drawing as in FIG. 20.
Figure 22:
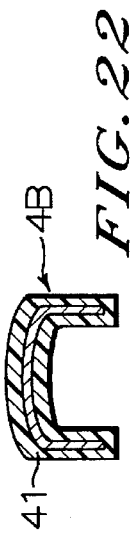
FIG. 22 is the J—J cross section of the drawing as in FIG. 20.

Thus, the resin-filled sections 4A as shown in FIG. 21 and the hollow sections 4B as shown in FIG. 22 are formed into the molding strip 4 of final shape. Separation and removal of the superfluous portions 42a can be carried out very easily and smoothly when done after the cooling process. Meanwhile, said separation process of the superfluous portions 42a can be carried out either before or after cutting the molding strips into unit lengths.

Under said extrusion method, the decorative body 41 finally forming hollow sections is apparently extruded together with virtually resin-filled sections which actually become superfluous portions 42a, and thus the whole length of the molding strips is extruded continuously and together.

When cutting said molding strips into unit lengths, by cutting around the centers of the resin-filled sections 4A as shown by the broken line 4C in FIG. 17, hollow cross-sectioned molding strips with both ends closed can be obtained.

Figure 23:
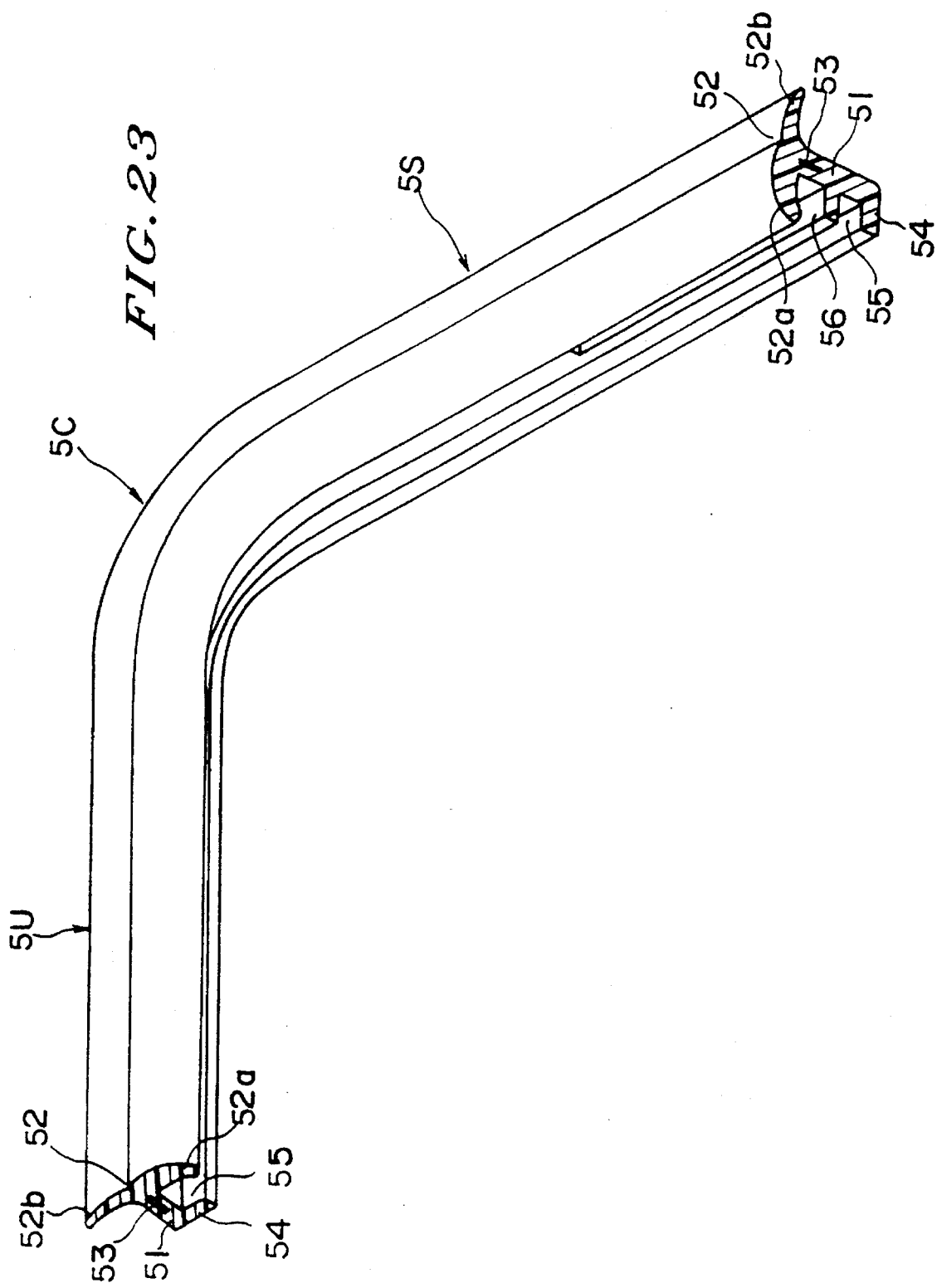
FIG. 23 is a perspective drawing of the curved section of a molding strip to cover the edges of automotive windshields.

Referring further to a windshield molding strip 5, as shown in FIG. 23, extruded and formed under the production method of this invention, the windshield molding strip 5 is produced to cover the periphery of windshield glass of automobiles and consists of the upper molding section 5U to be inserted into the space between the upper periphery of windshield glass and the roof panel edges, the side molding section 5S to be inserted into the space between the side periphery of windshield glass and the pillar panels and corner molding section 5C connecting, in a curved shape, the upper molding section 5U and the side molding section 5S. These molding sections 5U, 5C and 5S are extruded integrally and continuously as referred to later.

The windshield molding strip 5 is integrally extruded using elastic materials such as rubber and synthetic resins using an extruder referred to later, and consists of a leg part 51 which is inserted into the space between the periphery of the windshield glass and the edges of vehicle body panel and a decorative body 52 which covers the space from outside.

Inside the connecting portion of the leg part 51 and the decorative body 52 a thin metal plate 53 is embedded as a core material and along the inner end (low end) of the leg part 51, a support edge 54, which is to contact the internal periphery of the windshield glass, is integrally provided and projects by a prescribed distance throughout the whole length of the molding strip.

The decorative body 52 consists of an internal decoration section 52a which extends in lip form from the outer side of the leg part 51 (from upper side in drawing) toward the inside of the windshield glass and an external decoration section 52b which extends in lip toward the vehicle body panel side, and surrounded by said internal decoration section 52a and said external decoration section 52b, a windshield glass receiving groove 55 is compartmented in a U-shaped cross section.

The windshield glass receiving groove 55 is formed throughout the length of the molding strip with a uniform prescribed cross-sectional shape.

Also, the external decoration section 52b of the decorative body 52 is extruded with a uniform thickness and shape throughout the whole length of the molding strip, while the internal decoration section 52a is extruded to become gradually thicker at the portion ranging from the corner section to the side section.

This is to cover the increased gap between the external periphery of windshield glass and the edges of the vehicle body panel in the range from the corner section to the side section. To accompany the increased thickness of the internal decoration section 52a, the height of said leg part 51 is increased and the distance between the windshield glass receiving groove 55 and the decorative body 52 is expanded.

More specifically, the height of the leg part 51 which has the shortest height along the upper molding section 5A gradually increases from the midway of the corner molding section 5C toward the side molding section 5S, and the internal decoration section 52a is made gradually thicker according to the extent of increased height of the leg part 51. For the increased thickness of the internal decoration section 52a, the distance between the windshield glass receiving groove 55 and the decorative body 52 is expanded gradually.

Moreover, the increased thickness of said internal decoration section 52a reaches its maximum at the upper end of the side molding section 5S and such maximum thickness is maintained toward the lower end of the side molding section 5S. Consequently, the height of the leg part 51 reaches its maximum at the upper end of the side molding section 5S and such maximum height is maintained toward the lower end of the side molding section 5S. Also, the distance between the windshield glass receiving groove 55 and the decorative body 52 reaches its maximum at the upper end of the side molding section 5S and such maximum distance is maintained toward the lower end of the side molding section 5S.

At the portion of the side molding section 5S where the internal decoration section 52a is made thicker, the decorative body 52 is separated from the outside surface of the windshield glass by the distance corresponding to the increased thickness of said internal decoration section 52a, thus forming a wall face of a certain width. In such wall face formed by the increased thickness of said internal decoration section 52a, a grooved rainwater conduit flume 56 is provided in a U-shaped section to open toward the inside. The rainwater conduit flume 56 is grooved from an intermediate point toward the lower end of the side molding section 5S in a uniform rectangular cross-sectional shape.

Figure 24:
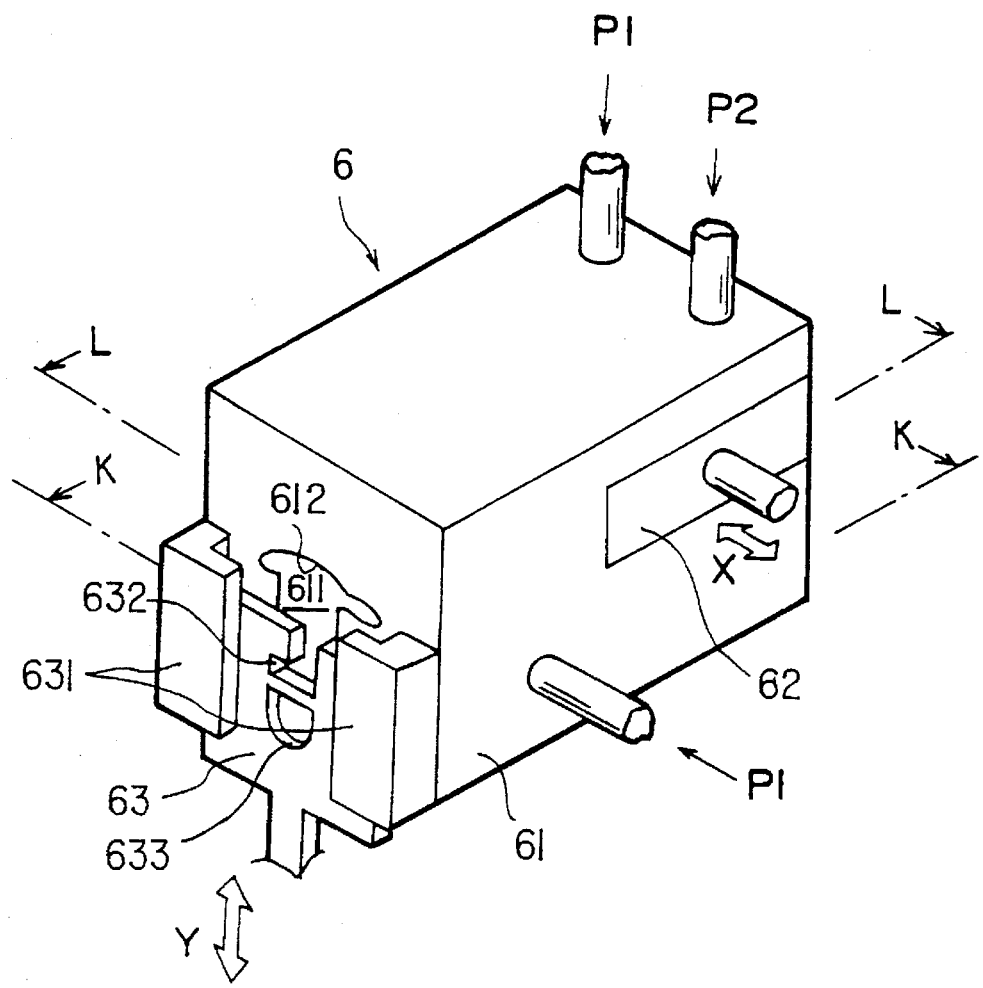
FIG. 24 is a perspective drawing of exemplary dies for extrusion of the molding strip to cover the edges of automotive windshields as is shown in FIG. 23.
Figure 25:
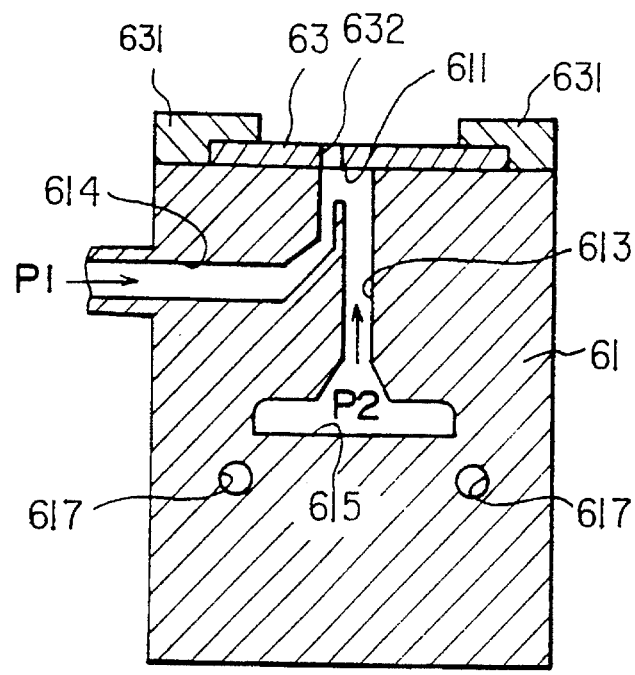
FIG. 25 is the horizontal K—K section of the drawing as in FIG. 24.
Figure 26:
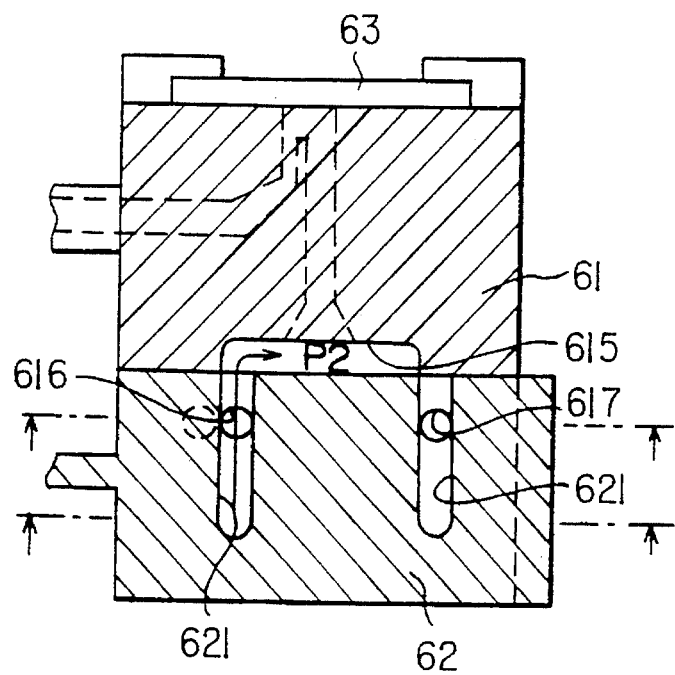
FIG. 26 is the horizontal L—L section of the drawing as in FIG. 24.
Figure 27:
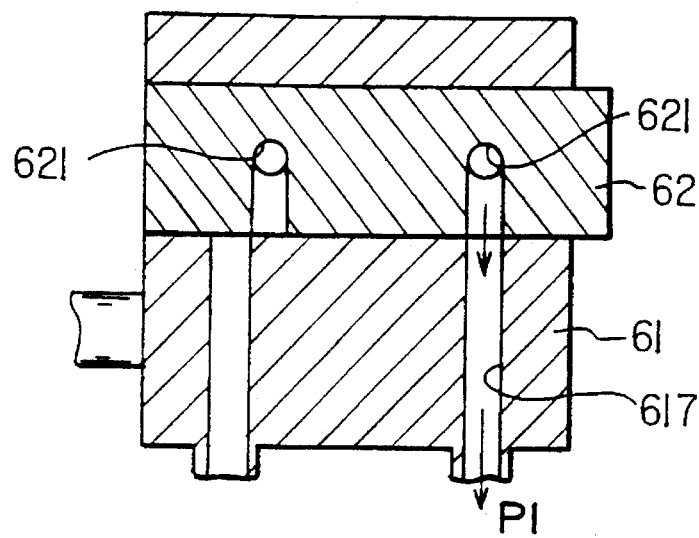
FIG. 27 is the M—M cross section of the drawing as in FIG. 26.
Figure 28:
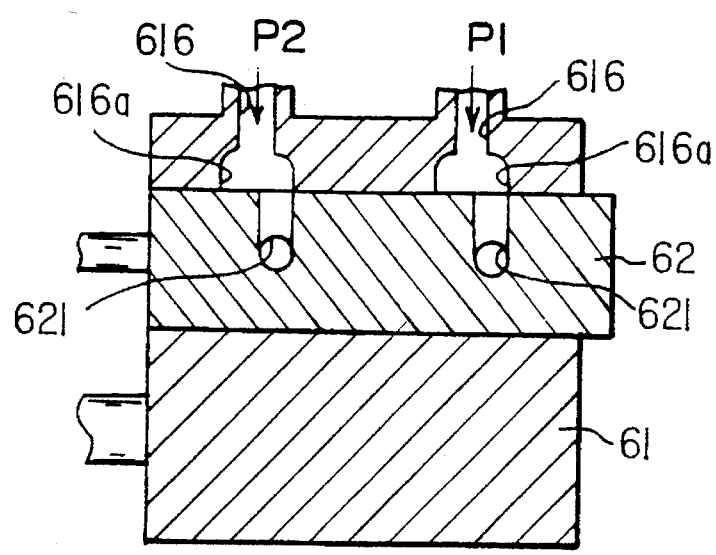
FIG. 28 is the N—N cross section of the drawing as in FIG. 26.

Referring next to the facility to form the automotive windshield molding strip 5 of said structure, said automotive windshield molding strip 5 can be obtained by passing the molding strips extruded through dies (extruder dies) 6 as shown in FIG. 24 before adding a separation process referred to later.

The dies 6 are comprised of the stationary first die 61, the second die 62 which is so designed as to move in parallel toward the horizontal direction (X-direction) perpendicular to the direction of extrusion and the third die 68 which is so designed as to move in parallel toward the vertical direction (Y-direction) perpendicular to the direction of extrusion so that the kind of material and the cross-sectional shape of the extruded workpiece coming out through an extrusion port 611 of the first die 61 may be switched-over by parallel shifts of the second die 62 and the third die 68.

As shown in FIG. 24, FIG. 25 to FIG. 28, an extrusion port 611 is provided in the first die 61 opening at its front face and the third die 63 made of a sheet-formed component is positioned in front of the first die 61 in a slidable structure along a pair of guide pieces 631, 631. Below the upper end of the third die 63 masking the extrusion port 611, as shown in the drawing, an extrusion shaper 632 is cut in a shape connected the leg part 51 and the support edge 54 of said windshield molding strip 5. The overall cross-sectional shapes of the windshield molding strip 6 are formed by combination of the extrusion shaper 632 of the third die 63 and an extrusion shaper 612 corresponding to the shape of the decorative body 52 provided at the extrusion port 611 of said first die 61. Also, provided in said third die 63 is an exhaust port 633 of surplus extrusion material occurring from masking the extrusion port 611 in the first die 61.

The flume extrusion channel 613 and the body extrusion channel 614 extend in succession behind the extrusion port 611 in the first die 61. The flume extrusion channel 613 opens into the area corresponding to the rainwater conduit flume 56 of the extrusion port 611, while the body extrusion channel 614 is positioned beside the flume extrusion channel 613 and opens to the whole extent of the extrusion port 611. The body extrusion channel 614 is led from the extrusion port 611 of the first die 61 turning toward the side face of said first die 61 and the supply source of the resin material P1, omitted in the drawing, is connected to the opening in the side face of the body extrusion channel 614, While, at the bottom of said flume extrusion channel 613, a reservoir 615 of prescribed cavity dimensions is provided and, facing said reservoir 615, the second die 62 is installed in a reciprocally movable structure in the horizontal direction perpendicular to the direction of extrusion.

In said second die 62, a pair of switch-over channels 621, 621 extending almost in parallel with the direction of extrusion are provided. The switch-over channels 621, 621 are so structured so as to open alternately into the cavity of the reservoir 615 of the first die 61 and changeover between the two switch-over channels 621 can be made by the parallel reciprocal movement of said second die 62.

Further, in the first die 61, a pair of material supply channels 616, 616 and a pair of material exhaust channels 617, 617 are positioned facing each other across the switch-over channels 621, 621 of the second die 62. Of these, the material supply channels 616, 616 are provided with tubs 616a, 616a which allow said material supply channels 616, 616 to always stay open into the switch-over channels 621, 621 of said second die 62.

Through one (right side one in drawing) of a pair of material supply channels 616, 616, resin material P1 is fed, while through the other material supply channel (left side one in drawing) 616, a different resin material P2 is supplied. The resin material P2 should be incompatible with the resin material P1, while, the material exhaust channels 617, 617 respectively are so arranged as to open alternately into respective switch-over channels 621, 621 of said second die 62, respectively opening through the bottom face of the first die 61.

Referring next to an exemplary embodiment of this invention for extrusion of the automotive windshield molding strips 5 using said facility, first, when extruding the lower part, or the portion provided with the flume grooving, of the side molding section 5S, the first die 61 and the second die 62 are shifted to the relative positions as shown in FIG. 25 to FIG. 28 and the third die 63 is shifted to the lowest end in the Y-direction in FIG. 24.

By this motion, between the two switch-over channels 621, 621 in the second die 62, the channel 621 in the open connection with the material supply channel 616 feeding the resin material P2 (left side one in drawing) opens into the reservoir 615 in the first die 61, while the other switch-over channel 621 which is in the open connection with the material supply channel 616 feeding the resin material P1 (right side one in drawing) remains away from the reservoir 615, being in closed state, but connects to the material exhaust channel 617. At this time, the extrusion shaper 632 in the third die 63 and the extrusion shaper 612 for the extrusion port 611 of the first die 61, in combination, form the resultant composite extrusion port of the maximum opening area corresponding to the cross section of the lower part of the side molding section 5S.

Under such a die motions, as shown by arrows in FIG. 25 to FIG. 28, the resin material P2 fed into the left side switch-over channel 621 in the drawing of the second die 62 via the left side material supply channel 616 in the drawing of the first die 61 is extruded through the area corresponding to the rainwater conduit flume 56 of the extrusion port 611 via the flume extrusion channel 613 in the first die 61, thus as shown in FIG. 33(A) forming the portion of the rainwater conduit flume 56 of the side molding section 5S filled with superfluous portions 56' made of the resin material P2. At this time, the resin material P1 is supplied constantly into the body extrusion channel 614 of the first die 61 and the resin material P1 is extruded through the peripheral area of the extrusion port 611 via the body extrusion channel 614 thus forming the shape surrounding said superfluous portions 56' made of the resin material P2 which is incompatible with resin material P1. Thus, the side molding section 5S is extruded with its cross section virtually filled with resin material throughout the length of the side molding section including a portion corresponding to the rainwater conduit flume 56 made of resin material P2 which is incompatible and removable later.

Meanwhile, the resin material P1 fed into the other switch-over channel 621 (right side one in drawing) in the second die 62 via the other material supply channel 616 (right side one in drawing) in the first die 61 bypasses the reservoir 615 and is exhausted externally via the material exhaust channel 617.

Figure 33:
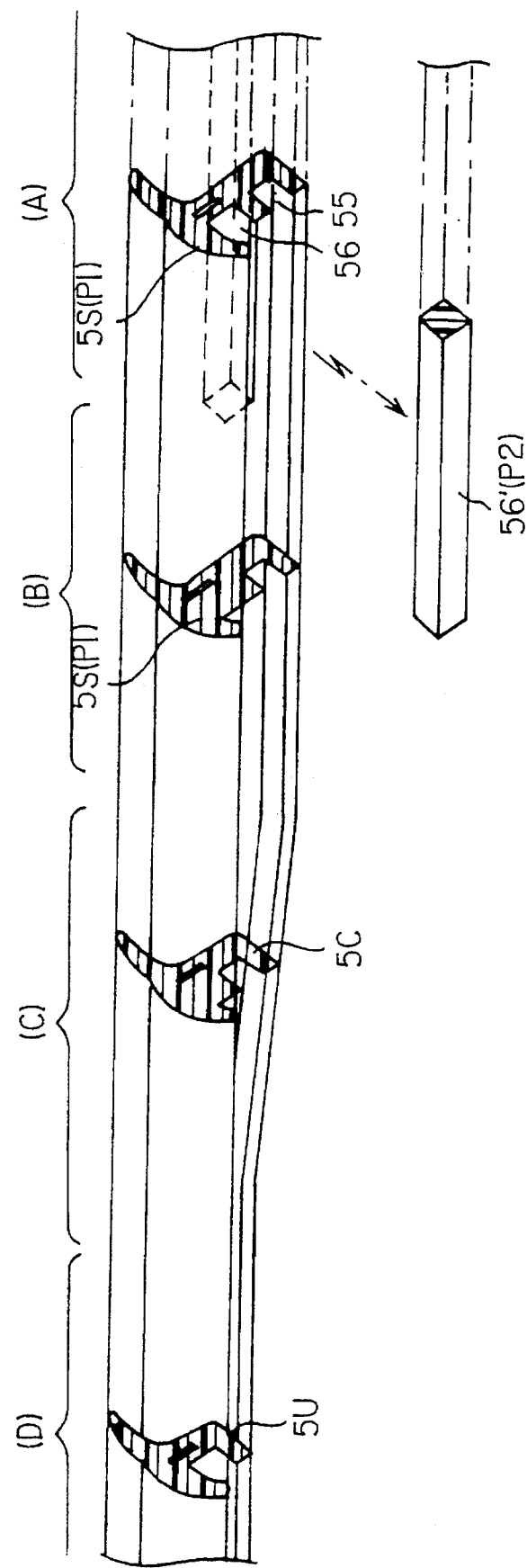
FIG. 33 is an inclined explanatory sketch drawing of the molding strip to cover the edges of automotive windshields as are shown in FIG. 28, from which the superfluous portions have been separated.

Next, when extruding the upper part, or the part where the flume is not grooved, of the side molding section 5S, the first die 61 and the second die 62 are shifted to the relative positions as shown in FIG. 29 to FIG. 32, while the third die 63 remains at the lowest end in the Y-direction as in FIG. 24. By this motion, between the two switch-over channels 621, 621, the one switch-over channel 621 in the open connection with the material supply channel 616 supplying the resin material P1 (right side one in drawing) is opened into the reservoir 615 in the first die 61, While, the other switch-over channel 621 in the open connection with the material supply channel feeding the resin material P2 (left side done in drawing) remains away from the reservoir 615, being closed, but connects to the material exhaust channel 617. At this time, the extrusion shaper 632 in the third die 63 and the extrusion shaper 612 for the extrusion port 611 of the first die 61, in combination, form the resultant composite extrusion port corresponding to the cross section of the lower part of the side molding section, or corresponding to the cross section as shown in FIG. 33 (B).

Figure 29:
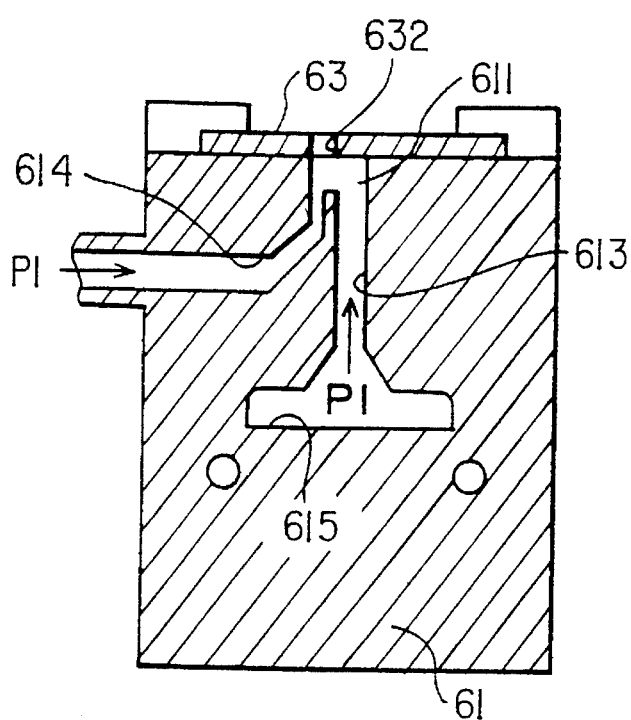
FIG. 29 is a cross sectional view indicating the motion of the dies as are shown in FIG. 25.
Figure 30:
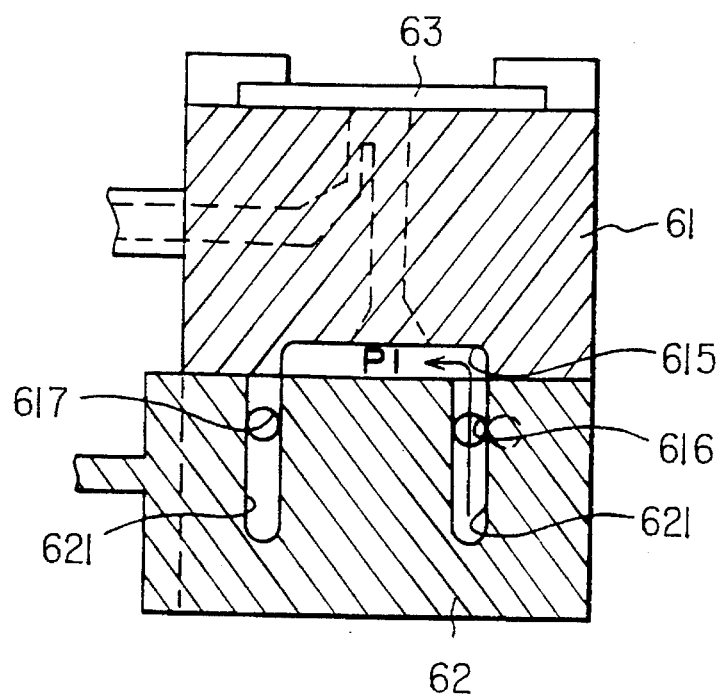
FIG. 30 is a cross sectional view indicating the motion of the dies as are shown in FIG. 26.
Figure 31:
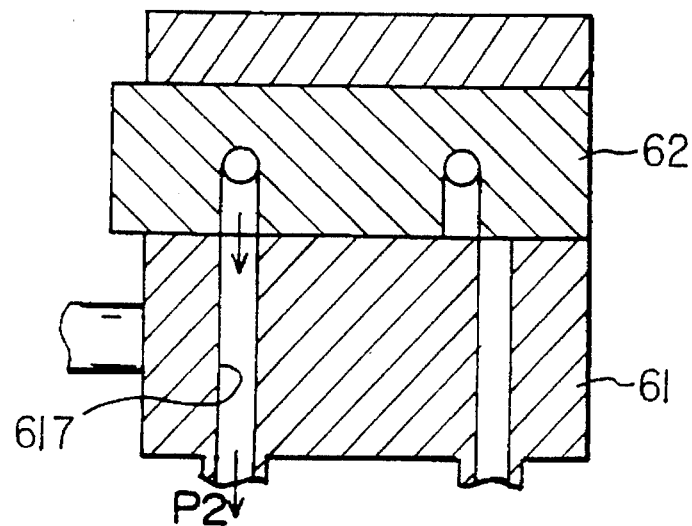
FIG. 31 is a cross sectional view indicating the motion of the dies as are shown in FIG. 27.
Figure 32:
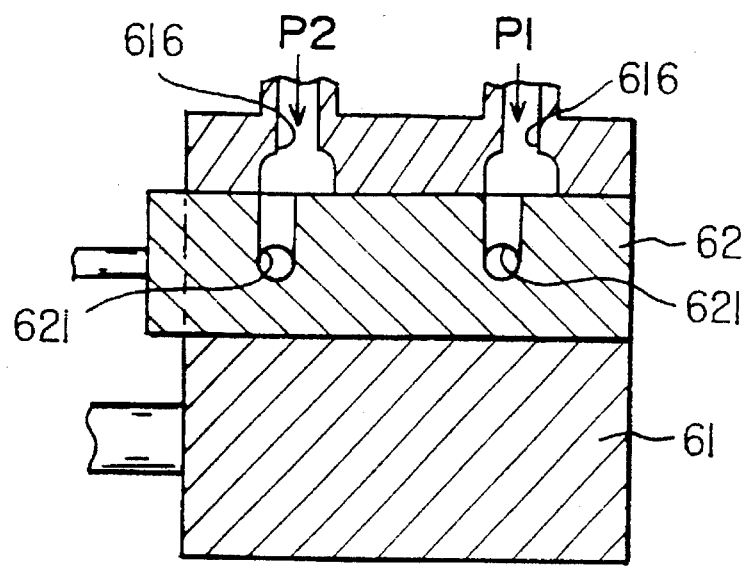
FIG. 32 is a cross sectional view indicating the motion of the dies as are shown in FIG. 28.

By said die motions, as shown by arrows in FIG. 29 to FIG. 30, the resin material P1 fed into the left side switch-over channel 621 in the drawing of the second die 62 via the right side material supply channel 616, in the drawing, of the first die 61 is extruded through the area corresponding to the rainwater conduit flume 56 of the extrusion port 611 via the flume extrusion channel 613 of the first die 61, thus forming the portion corresponding to the rainwater conduit flume 56 of the side molding section 5S in filled state by the same resin material P1 being used for other portions so that the rainwater conduit flume 56 disappears.

At this time, the resin material P1 is fed constantly into the body extrusion channel 614 in the first die 61 and the resin material P1 is extruded through the peripheral part of the extrusion molding 611 via the body extrusion channel 614. As a result, the side molding section 5S is extruded, using the resin material P1, in an integrally-filled cross section, without the groove being apparent.

At this time, the resin material P2 fed into the other switch-over channel 621 (left side one in drawing) of the second die 62 via the other material supply channel 616 (left side one in drawing) of the first die 61 bypasses the reservoir 615 to be exhausted externally through the material exhaust channel 617.

Meanwhile, the resin material used to fill the portion corresponding to the rainwater conduit flume 56 of the side molding section 5S can be of some other kind of resin material than P1, insofar as it is compatible with the resin material P1 which forms the other parts of the side molding section 5S.

Further, when extruding the corner molding section 5C, the first die 61 and the second die 62 remain at the relative positions as shown in FIG. 29 to FIG. 32, while the third die 68 is gradually raised from the lowest end in the Y-direction in FIG. 24. In other words, the distance between the extrusion shaper 632 in the third die 63 and the extrusion shaper 612 for the extrusion port 611 of the first die 61 is gradually narrowed starting from the position corresponding to the upper end of said side molding section 5S so as to form the composite extrusion port corresponding to the cross section of section (C) in FIG. 33. Thus, the corner molding section 5C is extruded in an integrally-filled cross-sectional shape by the resin material P1 with the thickness of the enlarged portion of the decorative body 52 being decreased gradually.

Next, when extruding the upper molding section 5U, the first die 61 and the second die 62 remain in the relative positions as shown in FIG. 29 to FIG. 32, but the third die 63 is shifted to the upper end in the Y-direction as in FIG. 24.

By this motion, the distance between the extrusion shaper 632 in the third die 63 and the extrusion shaper 612 for the extrusion port 611 of the first die 61 comes to the narrowest end so as to form the composite extrusion port of the minimum opening area corresponding to the minimum cross-sectional shape as per section (C) in FIG. 33. Thus, the upper molding section 5U is extruded in an integrally-filled cross section by resin material P1 throughout its length with the decorative body 52 being formed with the least thickness.

After obtaining molding strips under said extrusion method, in the lower pare of the side molding section 5S, or the section (D) in FIG. 33 where the flume is to be grooved, the superfluous portion 56' is separated and removed. By removal of said superfluous portion 56', rainwater conduit flume 56 appears in a U-groove shape in the thickened wall face of the internal decoration section 52a of the side molding section 5S, thus completing the final shape of automotive windshield molding strip 5.

Said separation and removal process of the superfluous portion 56' should preferably be carried out after the cooling process whereby removal of the superfluous portion 56' may be performed very easily and smoothly. Also, by using a water-soluble resin to form the superfluous portion 56', the cooling process in a water tank can simultaneously melt away the superfluous portion 56', thus making an independent removal process unnecessary. Meanwhile, the removal process of the superfluous portion 56' can be carried out either before or after cutting the molding strips into unit lengths.

Thus, by the extrusion method under this embodiment, the part of the molding strip wherein the flume is not to be formed is extruded in an integrally-filled cross section without an apparent flume by the compatible resin material, while the part of the molding strip wherein the flume needs to be formed is extruded with the portion filling the U-groove made of a resin material which is incompatible with that for other portions, such U-groove filling portion being removable later as the superfluous portion 56'.

Thus, throughout the whole length of the molding strip, the resin material to fill the U-groove is changed between the part where the flume is not required to be formed and the part where the flume needs to be formed to extrude the whole length of the molding strips integrally and continuously before carrying out a separation and removal process of the superfluous portion 56' to obtain the windshield molding strips with a rainwater conduit flume provided where necessary.

INDUSTRIAL APPLICABILITY

The production method under this invention can be applied to all types of lengthy molding strips for use with marine vessels, construction materials and other general machinery and equipment and is particularly suitable for continuous extrusion of molding strips consisting of alternative hollow sections and filled sections without need for a cutting process for removal of the superfluous portions.

I claim:

1. A method for forming a molding strip comprising:
   extruding a molding strip through an extrusion port by extruding first and second resin materials through said extrusion port, with said first and second resin materials being different from one another such that said second resin material is removable from said first resin material after extrusion, the step of extruding the molding strip including extruding said second material to form superfluous portions; and removing said superfluous portions from the molding strip to provide varying cross-sectional shapes along a length of said molding strip.

2. The method of claim 1, wherein the step of extruding said first and second resin materials includes alternating a supply of said first resin material and said second resin material at a predetermined cross-sectional location with the first and second resin materials alternated with respect to an extruding direction corresponding to a longitudinal direction of said molding strip such that after removal of said second resin material, a plurality of cavities are provided in said molding strip, with said plurality of cavities separated by ribs formed of said first resin material.

3. The method of claim 1, further including providing as said second resin material a resin material which is dissolved in a liquid, and wherein the removing step includes immersing said molding strip in said liquid to dissolve said second resin material.

4. The method of claim 1, further including alternating a supply of said first resin material and said second resin material at a predetermined cross-sectional location of said molding strip with the alternating occurring with respect to a longitudinal direction of said molding strip such that at said predetermined cross-sectional location said molding strip will have said first resin material alternating with said second resin material along said longitudinal direction.

5. The method of claim 1, wherein said second resin material is extruded at a location with respect to said first resin material such that upon removal of said second resin material a cavity is provided in said molding strip.

6. The method of claim 2, further including cutting said molding strip at a location of said ribs such that plural unit lengths are provided, and wherein in said cutting step a rib is divided into first and second portions, such that a first portion of said rib is associated with a first unit length and a second portion of said rib is associated with a second unit length, and such that said first and second portions of said rib each form a closed end portion of the respective first and second unit lengths to close one of said cavities at said closed end portion of the respective first and second unit lengths.

7. The method of claim 6, further including providing plural extrusion dies which are movable relative to one another to vary a cross-sectional shape of molding strip portions formed by said first resin along the longitudinal direction of said molding.

8. The method of claim 1, further including providing plural extrusion dies which are movable relative to one another to vary a cross-sectional shape of molding strip portions formed by said first resin along the longitudinal direction of said molding.

9. The method of claim 4, further including extruding a mounting portion at said predetermined cross-sectional location, such that after removal of said superfluous portions formed by said second resin material a plurality of mounting members are provided along said mounting strip with longitudinal spaces provided between said mounting members corresponding locations at which said second resin material was removed.

* * * * *

UNITED STATES PATENT AND TRADEMARK OFFICE
CERTIFICATE OF CORRECTION

PATENT NO. : 5,468,438
DATED : November 21, 1995
INVENTOR(S) : Yukihiko YADA

It is certified that error appears in the above-indentified patent and that said Letters Patent is hereby corrected as shown below:

In column 7, line 14, change "P2" to --P1--.

Signed and Sealed this

Thirteenth Day of May, 1997

Attest:

BRUCE LEHMAN

*Attesting Officer*     *Commissioner of Patents and Trademarks*